(12) United States Patent
Nomoto et al.

(10) Patent No.: US 8,876,355 B2
(45) Date of Patent: Nov. 4, 2014

(54) LIGHT GUIDE, LIGHT SOURCE APPARATUS, AND READING APPARATUS

(75) Inventors: Koya Nomoto, Saitama (JP); Nobuaki Kuribara, Saitama (JP); Kazuhito Kunishima, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/879,533

(22) Filed: Sep. 10, 2010

(65) Prior Publication Data

US 2011/0063870 A1    Mar. 17, 2011

(30) Foreign Application Priority Data

Sep. 17, 2009   (JP) ................. 2009-215547

(51) Int. Cl.
  *F21V 7/04*   (2006.01)
  *F21V 8/00*   (2006.01)
  *H04N 1/028*  (2006.01)

(52) U.S. Cl.
  CPC ............ *G02B 6/0036* (2013.01); *G02B 6/0068* (2013.01); *H04N 1/02885* (2013.01); *G02B 6/0045* (2013.01); *H04N 1/02865* (2013.01); *G02B 6/002* (2013.01); *G02B 6/0073* (2013.01); *H04N 1/02855* (2013.01)
  USPC ........... 362/625; 358/475; 358/485; 358/509; 358/146

(58) Field of Classification Search
  CPC .... G02B 6/002; G02B 6/0036; G02B 6/0073; H04N 1/02855
  USPC ......... 362/27, 245, 249.01, 249.02, 551, 555; 385/32–33, 146; 250/208.1, 227.11; 358/475, 482–484, 509
  See application file for complete search history.

(56) References Cited

U.S. PATENT DOCUMENTS

| 7,717,598 | B2 | 5/2010 | Kakizaki et al. |
| 2005/0025684 | A1 | 2/2005 | Jethrow et al. |
| 2008/0137334 | A1 | 6/2008 | Hsu et al. |
| 2009/0080038 | A1 | 3/2009 | Hayashide et al. |
| 2009/0218525 | A1 | 9/2009 | Ikeda et al. |

FOREIGN PATENT DOCUMENTS

| JP | 2008-123766 | 5/2008 |
| JP | 2009-080173 | 4/2009 |
| JP | 2009-093808 | 4/2009 |

OTHER PUBLICATIONS

European Search Report dated Jun. 4, 2012, in connection with counterpart EP Application No. 10 00 8195.
Japanese Office Action issued in connection with related Japanese Patent Application No. JP 2009-215547 dated Aug. 20, 2013.

*Primary Examiner* — Jason Moon Han
(74) *Attorney, Agent, or Firm* — Dentons US LLP

(57) ABSTRACT

A light guide includes an incident surface, an emitting surface, a reflecting surface, and a light guide section. The incident surface receives light from a plurality of light-emitting elements arranged at least in a first direction. The emitting surface outputs incident light from the incident surface. The reflecting surface includes a plurality of lenses having optical power in the first direction and a second direction different from the first direction and is provided to be opposed to the incident surface. The light guide section includes a surface including the incident surface, the emitting surface, and the reflecting surface, and causes the light that has entered from the incident surface to be reflected by the plurality of lenses of the reflecting surface to guide the light to the emitting surface.

7 Claims, 12 Drawing Sheets

LIGHT GUIDE, LIGHT SOURCE APPARATUS, AND READING APPARATUS

BACKGROUND OF THE INVENTION

1. Field of the Invention

The present invention relates to a light guide for guiding light from a light-emitting element for light emission, and a light source apparatus and a reading apparatus using the light guide.

2. Description of the Related Art

In recent years, as a light source of a scanner or a complex machine for reading an image or the like, a light emitting diode (LED) has been used. The use of an LED as a light source can provide a smaller apparatus when compared with a cold cathode fluorescent lighting (Lamp) (CCFL) as in the past (see, for example, Japanese Patent Application Laid-open No. 2008-123766; hereinafter, referred to as Patent Document 1).

In an image reading apparatus including LEDs disclosed in Japanese Patent Application Laid-open No. 2009-80173 (hereinafter, referred to as Patent Document 2), a light guide optical system for guiding the light from the LEDs to a reading surface (platen) has a plurality of optical surfaces cyclically provided in a direction along which the LEDs are arranged. The optical surfaces have power in the direction along which the LEDs are arranged. Thus, nonuniform illuminance is suppressed (see Patent Document 2, paragraph [0031], FIG. 1, for example).

SUMMARY OF THE INVENTION

In the case of the apparatus of Patent Document 1, there is a disadvantage that nonuniform illuminance is caused when a glossy object or an object having a relatively high reflectivity is read.

In the case of the apparatus of Patent Document 2, when a glossy object or the like is read, nonuniform illuminance is reduced. However, due to the cyclic structure of the optical surfaces of the light guide optical system in the direction along which the LEDs are arranged, a disadvantage is caused where nonuniform illuminance is generated in the direction along which the LEDs are arranged.

In view of the foregoing, it is desirable to provide a light guide, a light source apparatus, and a reading apparatus including the light guide and the light source apparatus by which nonuniform illuminance can be reduced even when a glossy object or an object having a relatively high reflectivity is read.

According to an embodiment of the present invention, there is provided a light guide including an incident surface, an emitting surface, a reflecting surface, and a light guide section.

The incident surface receives light from a plurality of light-emitting elements arranged in at least a first direction.

The emitting surface outputs incident light from the incident surface.

The reflecting surface includes a plurality of lenses that have optical power in the first direction and a second direction different from the first direction and is provided to be opposed to the incident surface.

The light guide section includes a surface including the incident surface, the emitting surface, and the reflecting surface, and causes the light that has entered from the incident surface to be reflected by the plurality of lenses of the reflecting surface to guide the light to the emitting surface.

The incident light from the incident surface can be diffused in both of the first direction and the second direction by the plurality of lenses. Thus, nonuniform illuminance can be reduced even when a glossy object or an object having a relatively high reflectivity is read.

The plurality of lenses may be arranged in a two-dimensional manner.

The light guide may further include a bottom surface. The bottom surface is provided between the incident surface and the reflecting surface and is provided to be opposed to the emitting surface. In this case, an angle obtained by adding an angle between a surface on which the plurality of lenses are two-dimensionally arranged and the bottom surface, and a maximum inclination angle between surfaces of the plurality of lenses and the surface on which the plurality of lenses are two-dimensionally arranged may be 120° or more.

Alternatively, the angle obtained by adding the angle between a surface on which the plurality of lenses are two-dimensionally arranged and the bottom surface, and the maximum inclination angle between the surfaces of the plurality of lenses and the surface on which the plurality of lenses are two-dimensionally arranged may be 130° or more.

The plurality of lenses may be arranged to form a honeycomb-like configuration. This allows the lenses to be arranged on the reflecting surface without causing gaps thereamong, thus reducing nonuniform illuminance.

According to another embodiment of the present invention, there is provided a light source apparatus including a plurality of light-emitting elements and the above-described light guide.

The plurality of light-emitting elements may be arranged also in a third direction different from the first direction. This can consequently reduce nonuniform illuminance due to an arrangement of light sources.

According to another embodiment of the present invention, there is provided a reading apparatus including a plurality of light-emitting elements, the above-described light guide, and a conversion element to convert, to an electric signal, reflection light from an object receiving the light output from the emitting surface.

As described above, according to the embodiments of the present invention, nonuniform illuminance can be reduced even when a glossy object or an object having a relatively high reflectivity is read.

These and other objects, features and advantages of the present invention will become more apparent in light of the following detailed description of best mode embodiments thereof, as illustrated in the accompanying drawings.

DESCRIPTION OF PREFERRED EMBODIMENTS

An embodiment of the present invention will be described below with reference to the drawings.

Figure 1:
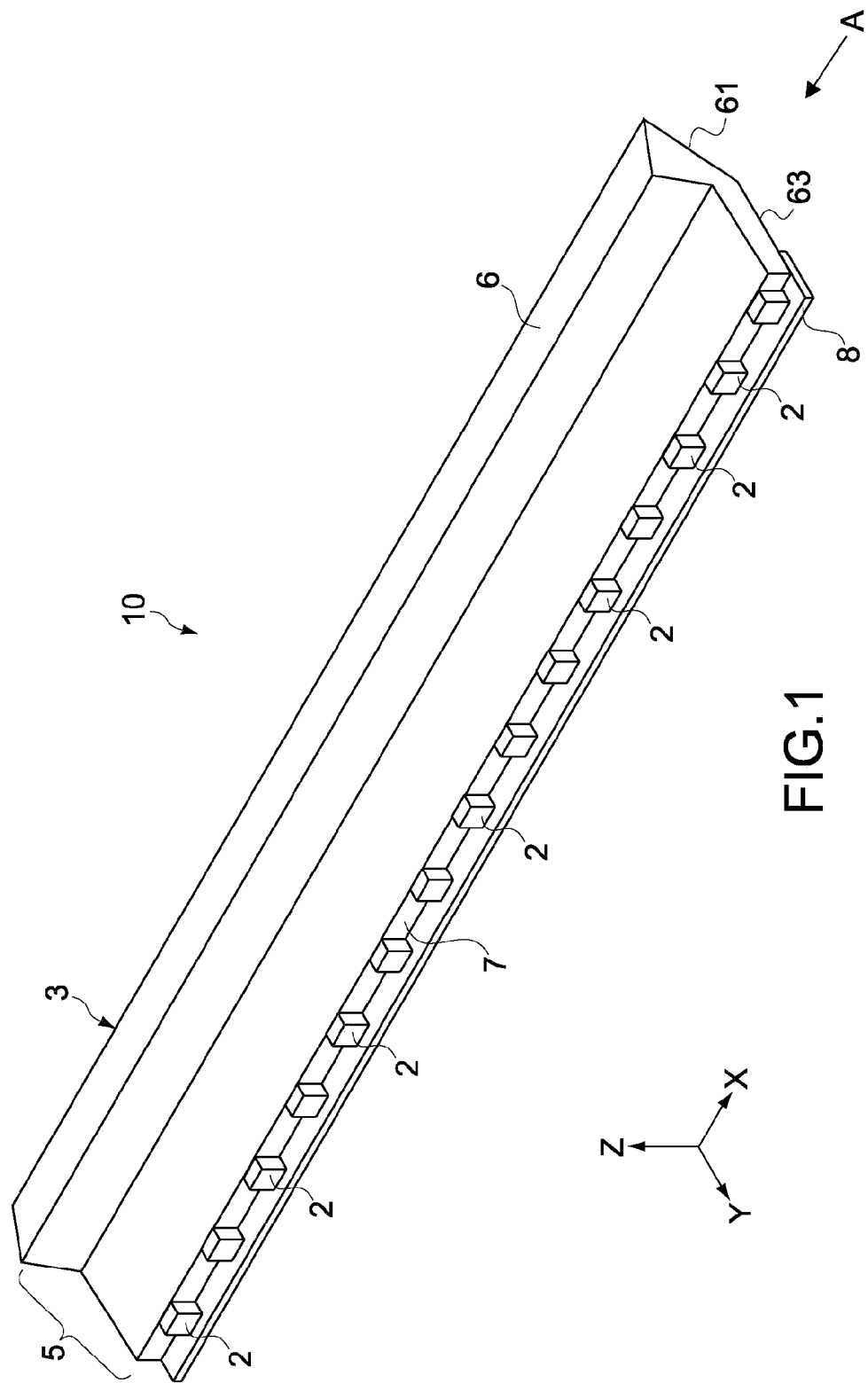
FIG. 1 is a perspective view illustrating a light source apparatus according to an embodiment of the present invention.
Figure 2:
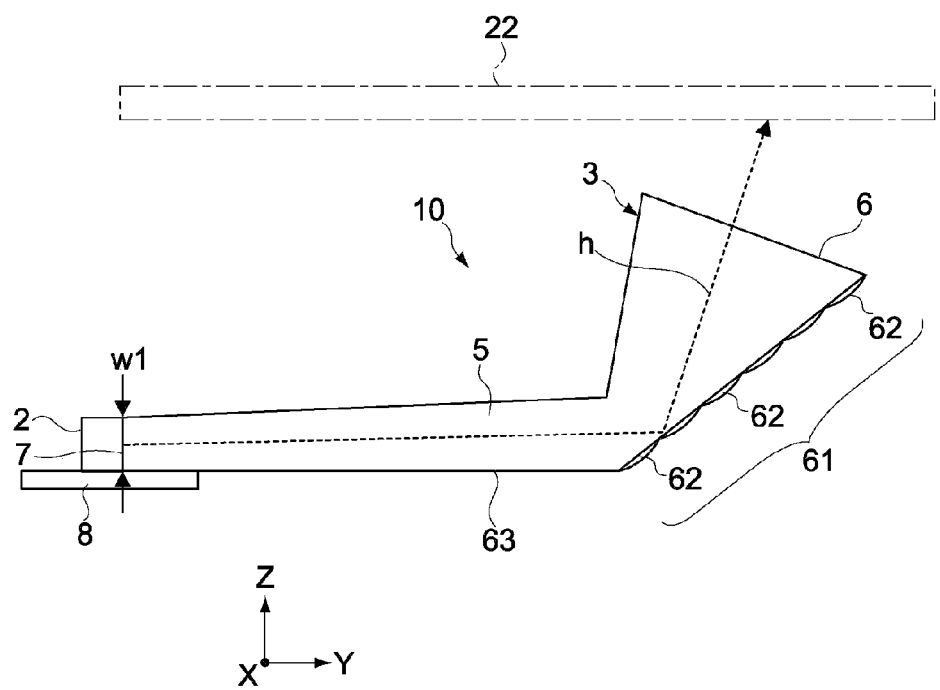
FIG. 2 is a diagram illustrating the light source apparatus seen in the direction of the arrow A shown in FIG. 1.
Figure 3:
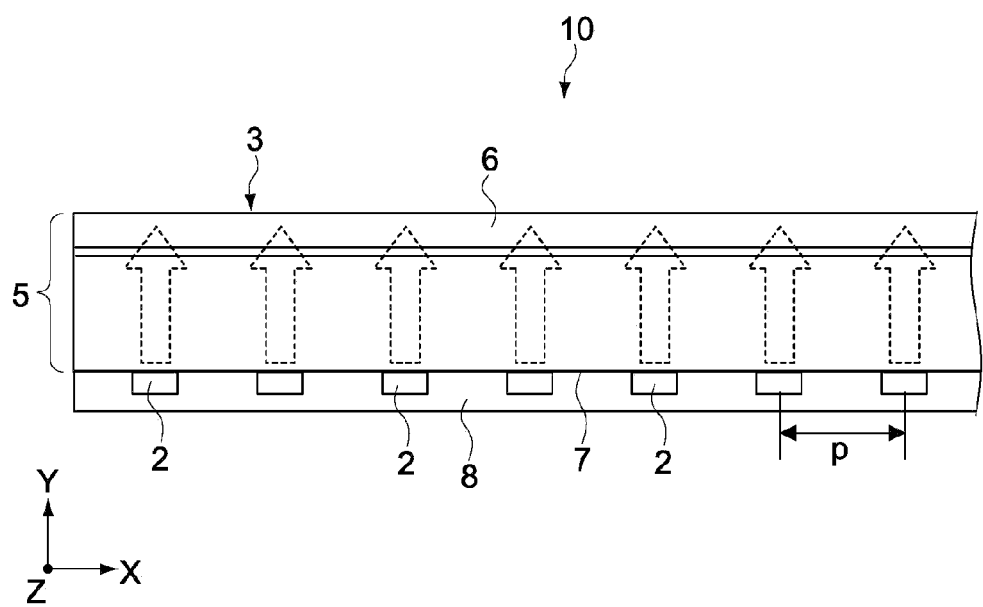
FIG. 3 is a top view illustrating a part of the light source apparatus.

FIG. 1 is a perspective view illustrating a light source apparatus according to an embodiment of the present invention. FIG. 2 is a diagram illustrating a light source apparatus 10 seen in the direction of the arrow A shown in FIG. 1. FIG. 3 is a top view illustrating a part of the light source apparatus 10.

As shown in FIG. 1 and FIG. 3, the light source apparatus 10 includes a plurality of light-emitting elements 2 provided, for example, in one direction (X direction) in a straight manner, and a light guide 3 for guiding in a predetermined direction the light output from the light-emitting elements 2. The light-emitting elements 2 are provided on a printed circuit board 8, for example. Each of the plurality of light-emitting elements 2 uses an LED having three light-emitting sources of red, green, and blue (RGB). The light-emitting element 2 emits white light obtained by combining the respective colors.

However, one light-emitting element 2 may also be configured to have one single-color light-emitting source or a plurality of single-color light-emitting sources. In this case, each light-emitting element 2 emits light of each color of R, G, or B, for example, and the light of the respective colors are mixed by the light guide 3. The LED may be an inorganic LED or an organic LED.

As shown in FIG. 2, the light guide 3 includes an incident surface 7, an emitting surface 6, a reflecting surface (main reflecting surface) 61, and a light guide section 5 including those surfaces 7, 6, and 61. Light from the plurality of light-emitting elements 2 enters the incident surface 7. The light guide section 5 reflects the light having entered from the incident surface 7 and causes the light to be reflected by the reflecting surface 61 opposed to the incident surface 7 to thereby guide the light to the emitting surface 6. Then, the light exits from the emitting surface 6. The light guide 3 (the light guide section 5) is provided to be bent at the middle from the incident surface 7 to the emitting surface 6. The wording "to be bent" means to include a shape as shown in FIG. 2 that has a clear folding line or a curved shape that has an unclear folding line.

The light guide 3 is formed by an integral molding. The light guide 3 may be typically made of an acrylic resin, but may also be made of glass, polycarbonate, or other transparent resins.

The incident surface 7 is formed as a flat surface, for example. The incident surface 7 has a width w1 in the Z direction (a width in the height direction) that is designed to be substantially the same width as that of a surface through which light is emitted from the light-emitting element 2 or a width slightly smaller than the width of the surface through which light is emitted from the light-emitting element 2. By the configuration as described above, the light output from the emitting surface 6 can be prevented from being mixed with a dark line, thus contributing to light uniformization. The emitting surface 6 is also formed as a flat surface.

Figure 4:
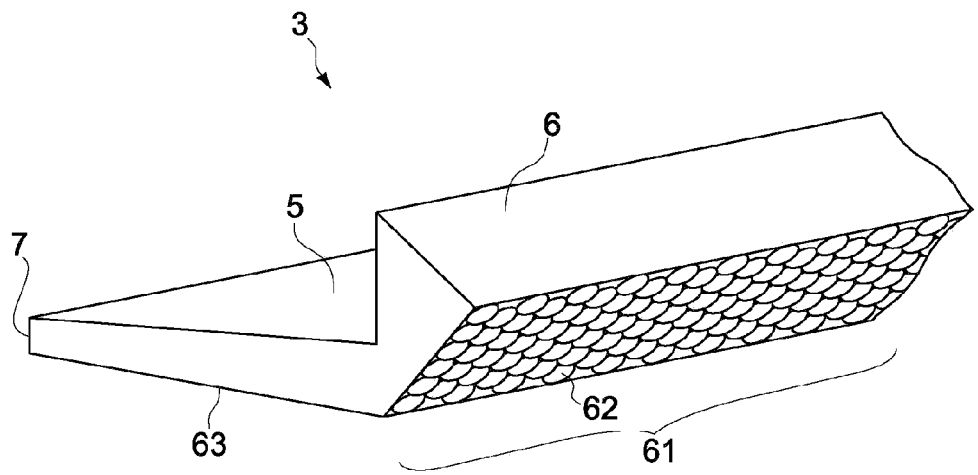
FIG. 4 is a perspective view illustrating a light guide seen from a reflecting surface side.
Figure 5:
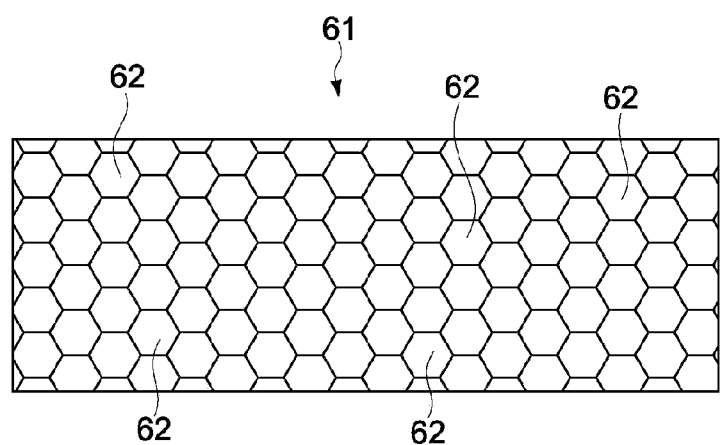
FIG. 5 is a diagram illustrating a part of the reflecting surface seen from the front side of the reflecting surface.

FIG. 4 is a perspective view illustrating the light guide 3 seen from the reflecting surface 61 side. FIG. 5 is a diagram illustrating a part of the reflecting surface 61 seen from the front side of the reflecting surface 61. The reflecting surface 61 includes a plurality of microlenses 62 as a plurality of lenses that have optical power at least in the arrangement direction of the light-emitting elements 2 and a direction different from the arrangement direction.

In a specific example, each of the microlenses 62 is formed to have a convex spherical or aspherical shape toward the outer side of the light guide 3 and the microlenses 62 are arranged in a two-dimensional manner. Thus, the respective microlenses 62 have optical power in a direction around optical axes of the respective microlenses 62. The respective microlenses 62 have a function to cause the light having entered through the incident surface 7 to be uniformly diffused and reflected in the light guide 3.

The microlenses 62 arranged in the two-dimensional manner typically form a honeycomb configuration. This configuration allows the microlenses 62 to be arranged on the reflecting surface 61 without gaps thereamong, thus reducing nonuniform illuminance.

Figure 6:
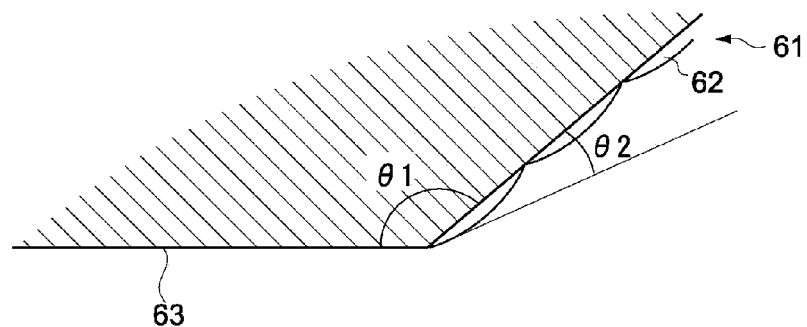
FIG. 6 is an expanded view of the neighborhood of the bottom surface and the reflecting surface of the light guide in FIG. 2.

FIG. 6 is an expanded view of a bottom surface 63 (which is a surface that is provided between the incident surface 7 and the reflecting surface 61 and that is provided so as to be opposed to the emitting surface 6) and the reflecting surface 61 in FIG. 2. In FIG. 6, an angle obtained by adding an angle $\theta 1(°)$ of the two-dimensional arrangement surface of the respective microlenses 62 to the bottom surface 63 and a maximum inclination angle $\theta 2(°)$ of the surfaces of the respective microlenses 62 to the two-dimensional arrangement surface is 120 or more. Specifically, $\theta 1+\theta 2 \geq 120$ is established. The relation of $\theta 1+\theta 2 \geq 132$ is more preferred. The reason will be described below.

Figure 7:
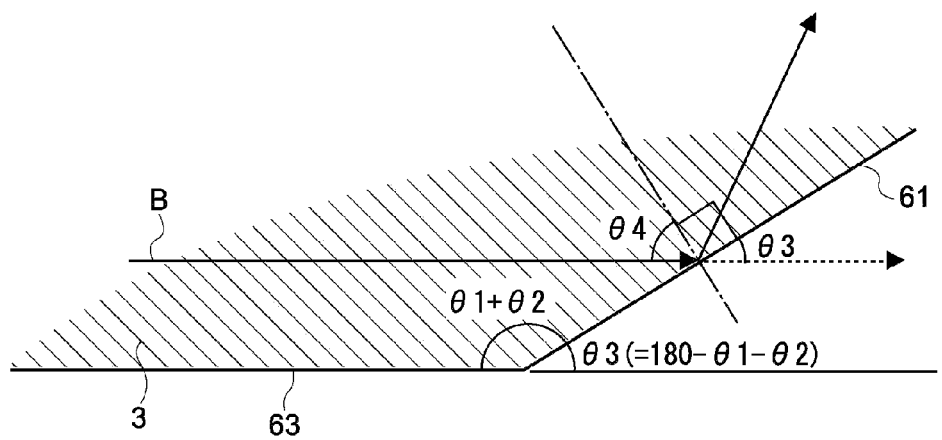
FIG. 7 is a diagram for describing the reason for the setting of an angle of the reflecting surface.

FIG. 7 is a diagram for explaining the reason. FIG. 7 shows that light B passing from the left to the right in a medium of the light guide 3 is reflected by the reflecting surface 61. In FIG. 7, the angle of the reflecting surface 61 is drawn as an angle including the maximum inclination angle $\theta 2$ of the microlenses 62 and is assumed as $\theta 1+\theta 2$. Most of the light B having entered through the incident surface of the light guide 3 proceeds to be substantially parallel to the bottom surface 63 until reaching the reflecting surface 61. This light enters the reflecting surface 61 at an incidence angle $\theta 4$. As the incidence angle $\theta 4$ to the reflecting surface 61 becomes closer to an angle causing total reflection (critical angle), the light use efficiency in the light guide 3 becomes higher.

From FIG. 7, θ3=(180−θ1θ2) is established and the following results are obtained.

$$\theta 4 = 90 - \theta 3 = \theta 1 + \theta 2 - 90$$

If the incidence angle θ4 is equal to or higher than 42° that is the critical angle of the light guide 3, light has total reflection at the reflecting surface 61. This is a critical angle of a transparent resin such as acrylic or glass. In other words, the highest light use efficiency can be obtained when the relation of θ1+θ2≥132 is established. The upper limit value of θ1+θ2 may be 180°. Although a typical example of θ1+θ2 may be 120° or more as described above, θ1+θ2 may also be 130° or more, or 135° or more.

Figure 8:
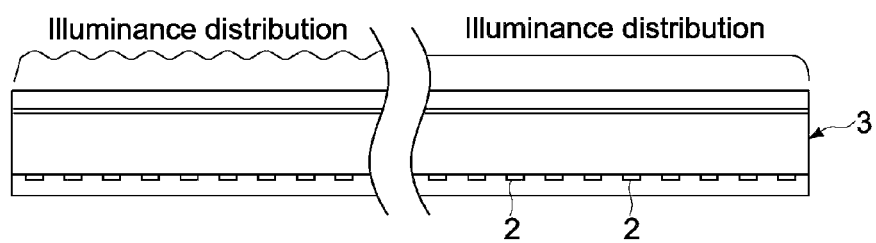
FIG. 8 is a schematic view illustrating light illuminance distributions of a light guide in the past and a light guide according to the embodiment.

As described above, by the light guide 3 according to this embodiment, the incident light from the incident surface 7 can be uniformly diffused in the light guide 3 by the plurality of microlenses 62. Thus, as shown on the right side of FIG. 8, the illuminance distribution of the light from the emitting surface 6 can be uniformized. In FIG. 8, the left side shows the illuminance distribution when a light guide in the past is used in which a reflecting surface has a flat surface or a cylindrical surface.

Further, since light can be uniformly diffused on the reflecting surface 61 in the light guide 3 according to this embodiment, an optical path length h (see FIG. 2) can be made shorter than that of a known product disclosed in Patent Document 1. In the case of the known product, when a pitch p (see FIG. 3) is longer than the optical path length h, there is caused a concern of increased nonuniform illuminance. In this embodiment, however, the optical path length h is tenuously associated with the arrangement pitch p of the respective light-emitting elements 2, thus providing an improved freedom degree to the design of the light guide 3.

An approach may be considered not to form the microlens 62 on the reflecting surface 61 but to form a mirror layer of silver for example on the reflecting surface. However, this approach needs a step of forming the mirror layer by vapor deposition, thus causing an additional cost. In contrast with this, this embodiment can provide the light guide 3 having the microlens 62 formed by a mold.

Figure 9:
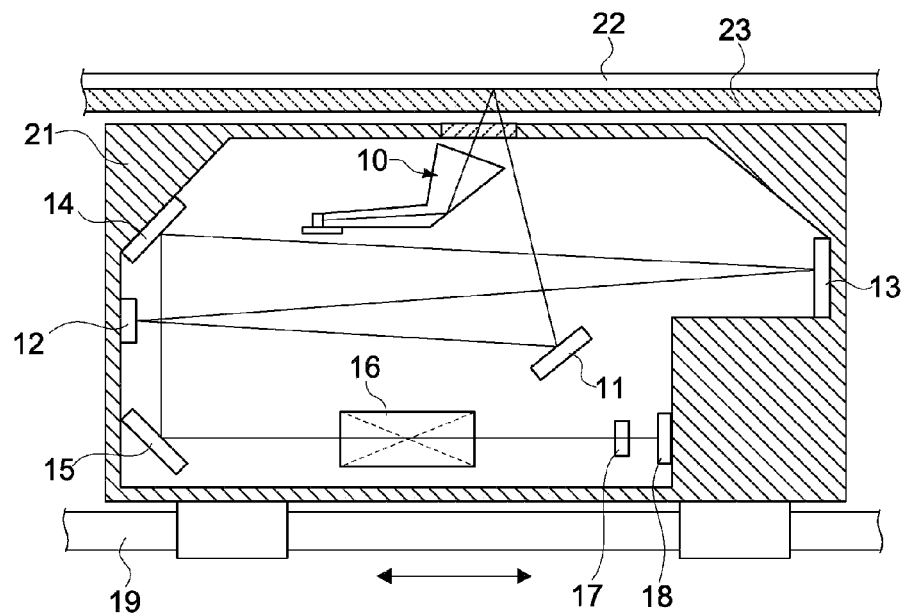
FIG. 9 is a cross-sectional view illustrating a carriage including the light source apparatus.
Figure 9:
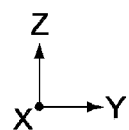
Figure 10:
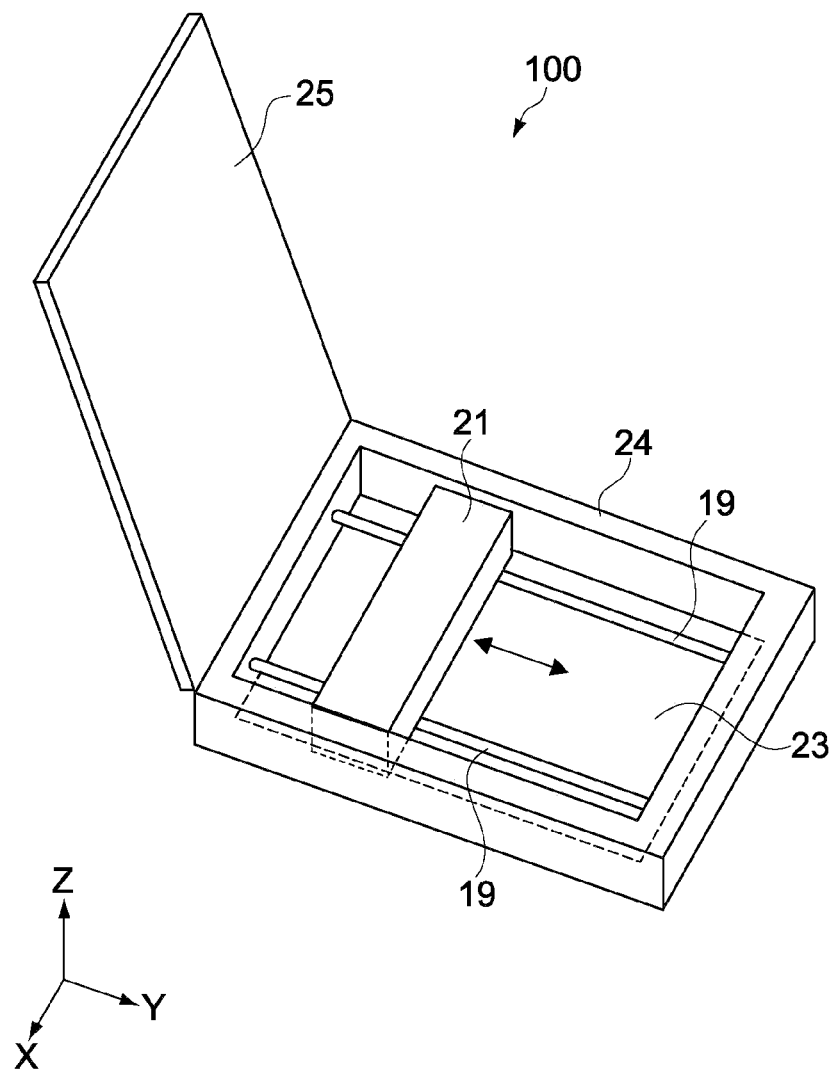
FIG. 10 is a perspective view illustrating a scanner apparatus as a reading apparatus including the carriage.

FIG. 9 is a cross-sectional view illustrating a carriage including the light source apparatus 10. FIG. 10 is a perspective view illustrating a scanner apparatus as a reading apparatus including this carriage 21. The scanner apparatus 100 includes a body 24 having a placing surface 23 on which an irradiation object 22 (see FIG. 2, FIG. 9) such as a document or a photograph is placed, and a cover 25 attached to the body 24 so that the cover 25 can be opened and closed. The placing surface 23 is made of, for example, glass or resin having a high light transmittance. The body 24 includes therein a motor (not shown), for example, for moving the carriage 21 in a straight direction (Y direction) in order to read the entire surface of the irradiation object 22 placed on the placing surface 23. Furthermore, the body 24 also includes therein guide rails 19 for guiding the move of the carriage 21. The guide rails 19 are connected to the lower part of the carriage 21 as shown in FIG. 10, for example. The configuration of the scanner apparatus 100 is not limited to the shown configuration and may also be subjected to an appropriate design change.

As shown in FIG. 9, this carriage 21 includes therein the light source apparatus 10, a plurality of mirrors 11, 12, 13, 14, and 15, a lens system 16 for image formation, an optical path length adjustment element 17, and an image sensor 18 as a photoelectric conversion element. The plurality of mirrors 11 to 15 are provided in the manner as described above in order to maximize the optical path length from the light source apparatus 10 to the image sensor 18. These mirrors 11 to 15 have a long shape extending in the X direction. The lens system 16 is typically configured by a plurality of lenses. The optical path length adjustment element 17 adjusts an optical path difference between infrared light and general light, for example. The image sensor 18 may be a CCD, for example. The image sensor 18 may also be, in addition to CCD, a complementary metal-oxide semiconductor (CMOS) sensor. Depending on the type of the image sensor 18, the configuration of the optical system in the carriage 21 can also be appropriately changed.

As described above, in the light guide 3 according to this embodiment, the incident light from the incident surface 7 is uniformly diffused and reflected in the light guide 3 by the plurality of microlenses 62. Thus, nonuniform illuminance can be reduced even when the glossy irradiation object 22 or the irradiation object 22 having a relatively high reflectivity is read.

Figure 11A:
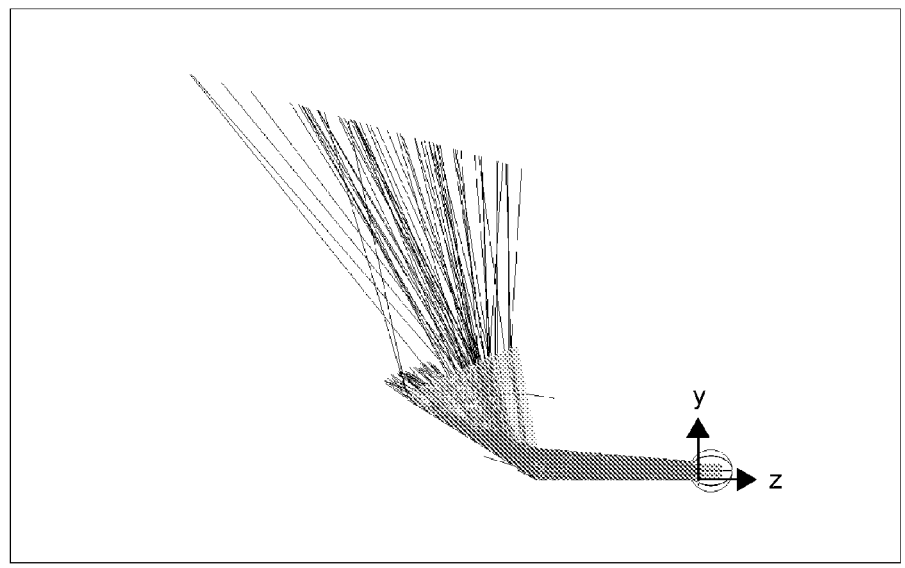
FIG. 11A and FIG. 11B are ray tracing diagrams of the light guide according to the embodiment that are prepared through simulation.
Figure 11B:
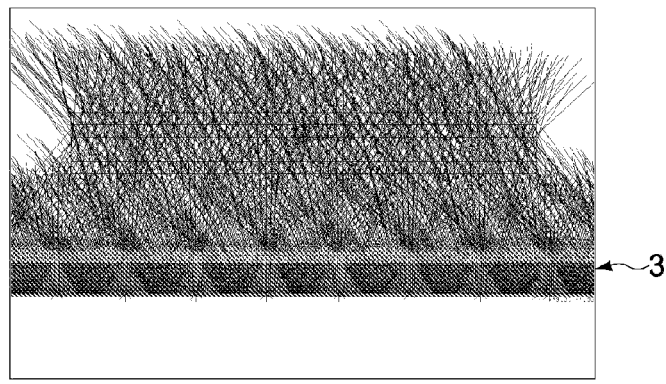
Figure 11C:
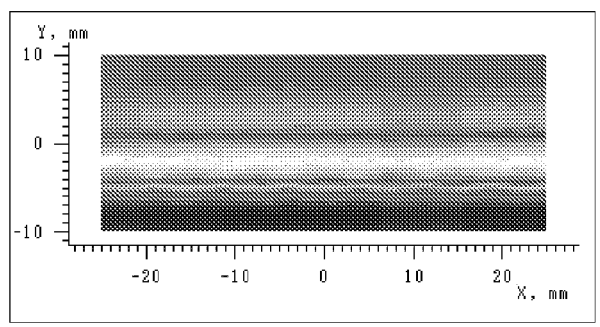
FIG. 11C is a diagram illustrating light uniformity.

FIGS. 11A and 11B are ray tracing diagrams of the light guide 3 according to this embodiment that are prepared through simulation. FIG. 11A is a cross-sectional view. FIG. 11B is a top view. FIG. 11C is a diagram showing the uniformity of the light guide according to this embodiment, prepared through simulation, and corresponds to the top view of FIG. 11B, in which the horizontal axis shows an X axis direction (see FIG. 1, for example) and the vertical axis shows a Y axis direction.

Figure 12A:
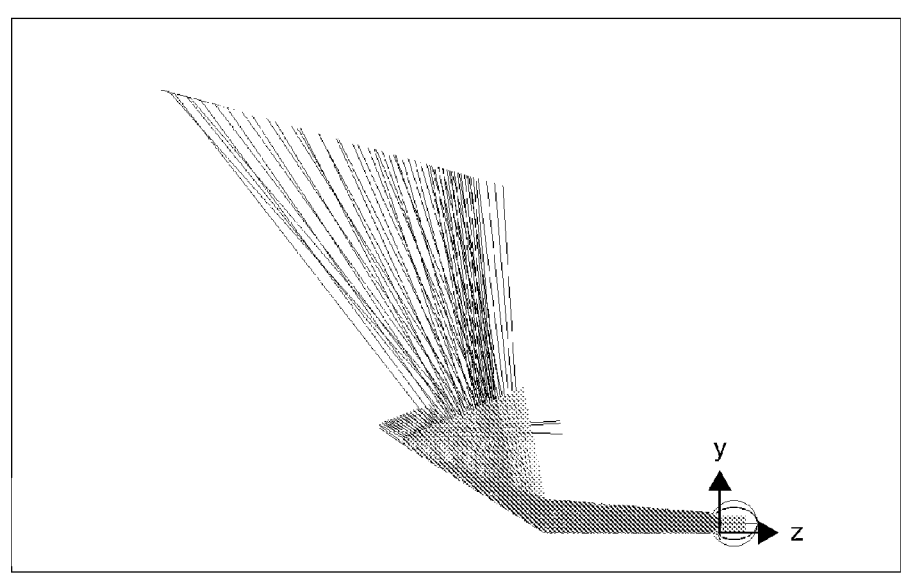
FIGS. 12A to 12C are diagrams illustrating a light guide not having a microlens (a reflecting surface is a flat surface) and correspond to FIGS. 11A to 11C, respectively.
Figure 12B:
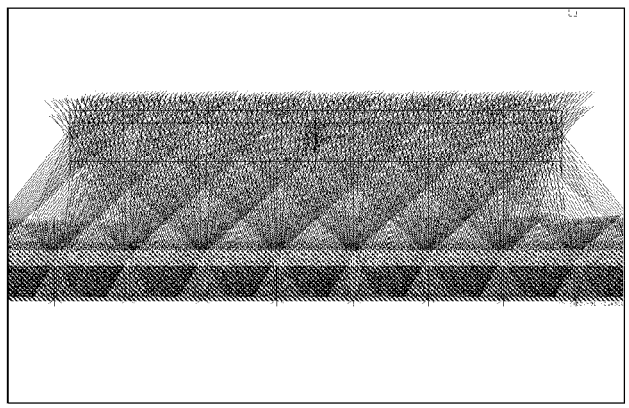
Figure 12C:
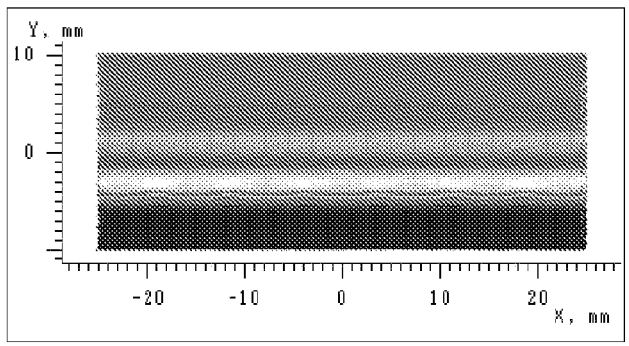

FIGS. 12A to 12C correspond to FIGS. 11A to 11C, respectively, and illustrate a light guide not having a microlens (a reflecting surface is a flat surface).

As shown in these drawings, when the light guide of FIGS. 11A to 11C is compared with that of FIGS. 12A to 12C, the former provides uniform diffusion of incident light on the reflecting surface 61, thus reducing nonuniform illuminance. In FIG. 11C and FIG. 12C, light-emitting elements are arranged in the vicinity of −5 mm in the Y axis. When FIG. 11C is compared with FIG. 12C, a white strip-like part and light-gray strip-like parts sandwiching the white part appearing in FIG. 11C are wider than those of FIG. 12C. This shows an improvement in the uniformity of light diffusion, i.e., illuminance uniformity.

Figure 13:
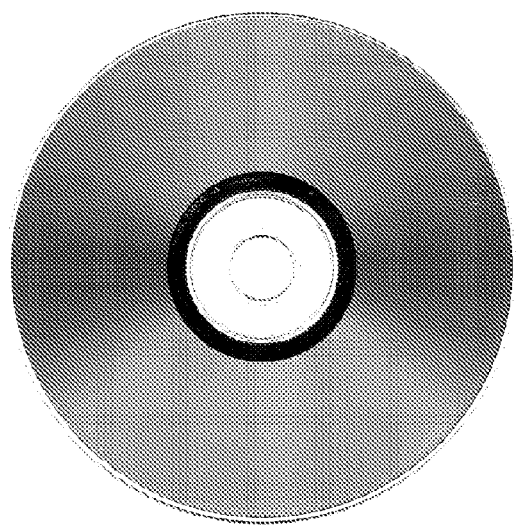
FIG. 13 is an image of a disk recording medium actually read by a scanner apparatus using the light guide according to the embodiment.
Figure 14:
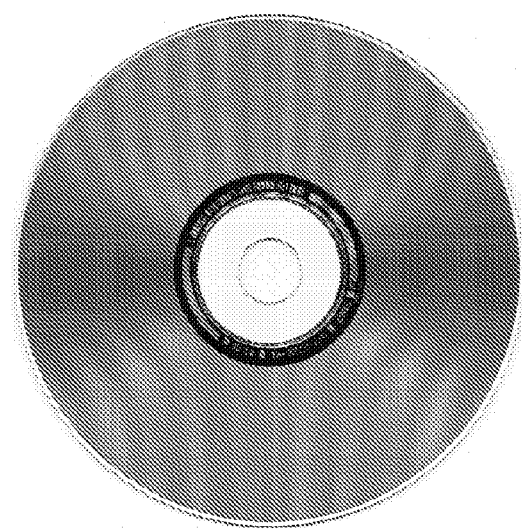
FIG. 14 is an image of a disk recording medium actually read by a scanner apparatus using a light guide not having a microlens (a reflecting surface is a flat surface)
Figure 15:
FIG. 15 is an image of a disk recording medium read by an apparatus using a light guide optical system according to Patent Document 2 described above.

FIG. 13 is an image of a disk recording medium actually read by the scanner apparatus 100 using the light guide 3 according to this embodiment. FIG. 14 is an image of a disk recording medium actually read by a scanner apparatus using a light guide not having a microlens (a reflecting surface is a flat surface). FIG. 15 is an image of a disk recording medium read by an apparatus using a light guide optical system according to Patent Document 2 described above. An identical disk recording medium is used in FIG. 13 to FIG. 15.

When the image of FIG. 14 is compared with the image of FIG. 15, the image read by the apparatus of Patent Document 2 (FIG. 15) shows reduced nonuniform illuminance. However, a comparison between FIG. 13 and FIG. 15 shows that this embodiment shown in FIG. 13 provides a further reduced nonuniform illuminance. As can be seen from FIG. 15, light and dark lines appear at substantially the same pitch especially at the upper and lower parts of the disk recording medium.

The embodiment according to the present invention is not limited to the above-described embodiment. Various other embodiments may be used.

The light-emitting element 2 may also be a laser diode instead of the LED.

Any shape of microlenses seen from the front side of the main reflecting surface of the light guide may be used as long as the microlenses have optical power at least in two directions of the arrangement direction thereof and a direction different from the arrangement direction. For example, the shape may be a circle, an ellipse, a polygon of three or more sides, or a combination of at least two of these shapes.

Alternatively, the microlens may also be formed to have such a shape by which the optical power thereof is different at least in the above two directions, for example. Such a shape of the microlens 62 typically includes an ellipse. In this case, the ellipse may have a long axis (or a short axis) that corresponds to the arrangement direction of the light-emitting elements 2.

By appropriately setting a length ratio between the long axis and the short axis of the ellipse, the illuminance distribution thereof can be changed appropriately.

The arrangement of the microlenses is not limited to the honeycomb-like regular hexagon one. The microlenses may also be arranged in a matrix in the longitudinal and lateral directions or may be arranged randomly. The respective microlenses may also have gaps thereamong. Even in such a case, any shape of each microlens seen from the front side of the main reflecting surface may be used as long as the microlens provides an optical power at least in the above two directions.

Although the microlens 62 is a convex lens, the microlens 62 may also be a concave lens. Specifically, the main reflecting surface may have a plurality of concavities to the interior of the light guide.

In the above embodiment, the light-emitting elements 2 are arranged in a row. However, the light-emitting elements 2 may also be arranged in a plurality of rows in the Z axis direction. In this case, the respective light-emitting elements may be arranged to be dislocated from one another (in a honeycomb-like arrangement, for example). If the size of the light-emitting element itself is reduced, the incident surface 7 can have the same area as that of FIG. 1 to thereby increase the number of light-emitting elements.

The emitting surface of the light guide may be a spherical or an aspherical convex shape. Alternatively, the emitting surface may be a flat surface formed by blast processing.

The present application contains subject matter related to that disclosed in Japanese Priority Patent Application JP 2009-215547 filed in the Japan Patent Office on Sep. 17, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light guide, comprising:
   an incident surface configured to receive light from a plurality of light-emitting elements arranged at least along a first direction;
   an emitting surface configured to output diffused light;
   a reflecting surface positioned to receive the incident light and reflect the incident light toward the emitting surface; the reflecting surface including a plurality of lenses arranged in a two-dimensional matrix, the lenses shaped to have radii of curvature at least in the first direction and in a second direction orthogonal to the first direction and to have non-zero optical power in the first and second directions;
   a bottom surface coupled between the incident surface and the reflecting surface and coupled to be opposed to the emitting surface; and
   a light guide section including the incident surface, the emitting surface, the reflecting surface, and the bottom surface, and configured to guide the light received via the incident surface to the plurality of lenses of the reflecting surface and thence to the emitting surface.

2. The light guide of claim 1, wherein an angle obtained by adding an angle between a surface on which the plurality of lenses are two-dimensionally arranged and the bottom surface, and a maximum inclination angle between surfaces of the plurality of lenses and the surface on which the plurality of lenses are two-dimensionally arranged is 120° or more.

3. The light guide of claim 2, wherein the angle obtained by adding the angle between a surface on which the plurality of lenses are two-dimensionally arranged and the bottom surface, and the maximum inclination angle between the surfaces of the plurality of lenses and the surface on which the plurality of lenses are two-dimensionally arranged is 135° or more.

4. The light guide of claim 1, wherein the plurality of lenses are arranged to form a honeycomb-like configuration.

5. A light source apparatus, comprising:
   (a) a plurality of light-emitting elements arranged at least along a first direction; and
   (b) a light guide including
      (1) an incident surface configured to receive light from the plurality of light-emitting elements,
      (2) an emitting surface configured to output diffused light,
      (3) a reflecting surface positioned to receive the incident light and reflect the incident light toward the emitting surface; the reflecting surface including a plurality of lenses arranged in a two-dimensional matrix, the lenses shaped to have radii of curvature at least in the first direction and in a second direction orthogonal to the first direction and to have non-zero optical power in the first and second directions,
      (4) a bottom surface coupled between the incident surface and the reflecting surface and coupled to be opposed to the emitting surface, and
      (5) a light guide section including the incident surface, the emitting surface, the reflecting surface, and the bottom surface, and configured to guide the light received via the incident surface to the plurality of lenses of the reflecting surface and thence to the emitting surface.

6. The light source apparatus of claim 5, wherein the plurality of light-emitting elements are arranged also in a third direction different from the first direction.

7. A reading apparatus, comprising:
   (a) a plurality of light-emitting elements arranged at least in a first direction;
   (b) a light guide including
      (1) an incident surface configured to receive light from the plurality of light-emitting elements,
      (2) an emitting surface configured to output diffused light,
      (3) a reflecting surface positioned to receive the incident light and reflect the incident light toward the emitting surface; the reflecting surface including a plurality of lenses arranged in a two-dimensional matrix, the lenses shaped to have radii of curvature at least in the first direction and a second direction orthogonal to the first direction and to have non-zero optical power in the first and second directions,
      (4) a bottom surface coupled between the incident surface and the reflecting surface and coupled to be opposed to the emitting surface, and
      (5) a light guide section including the incident surface, the emitting surface, the reflecting surface, and the bottom surface, and configured to guide the light received via the incident surface to the plurality of lenses of the reflecting surface and thence to the emitting surface.

* * * * *